United States Patent
Yoo et al.

(10) Patent No.: US 10,643,107 B1
(45) Date of Patent: May 5, 2020

(54) METHOD FOR NEURAL NETWORK TRAINING USING DIFFERENCES BETWEEN A PLURALITY OF IMAGES, AND APPARATUS USING THE METHOD

(71) Applicant: Lunit Inc., Seoul (KR)

(72) Inventors: Dong Geun Yoo, Seoul (KR); Hyun Jae Lee, Seoul (KR)

(73) Assignee: LUNIT INC., Seoul (KR)

( * ) Notice: Subject to any disclaimer, the term of this patent is extended or adjusted under 35 U.S.C. 154(b) by 0 days.

(21) Appl. No.: 16/682,198

(22) Filed: Nov. 13, 2019

(30) Foreign Application Priority Data

Apr. 2, 2019 (KR) .......................... 10-2019-0038145

(51) Int. Cl.
*G06K 9/00* (2006.01)
*G06K 9/62* (2006.01)
*G06K 9/46* (2006.01)
*G06N 3/08* (2006.01)
*G06N 3/04* (2006.01)

(52) U.S. Cl.
CPC .............. *G06K 9/6256* (2013.01); *G06K 9/46* (2013.01); *G06K 9/6202* (2013.01); *G06K 9/6215* (2013.01); *G06N 3/0454* (2013.01); *G06N 3/08* (2013.01)

(58) Field of Classification Search
CPC ...... G06K 9/6256; G06K 9/46; G06K 9/6202; G06K 3/08; G06K 9/6215; G06K 3/0454
See application file for complete search history.

(56) References Cited

U.S. PATENT DOCUMENTS

| | | | |
|---|---|---|---|
| 2016/0095563 A1* | 4/2016 | Fukuda | A61B 6/461 378/21 |
| 2018/0078231 A1* | 3/2018 | Butani | G06T 7/0014 |
| 2019/0259134 A1* | 8/2019 | Rainy | G06N 3/08 |

FOREIGN PATENT DOCUMENTS

KR          10-1396308          5/2014

OTHER PUBLICATIONS

Sungil Choi et al., "Learning Descriptor, Confidence, and Depth Estimation in Multi-view Stereo", Proceedings of the IEEE Conference on Computer Vision and Pattern Recognition Workshops. 2018. pp. 389-395.

(Continued)

*Primary Examiner* — Tom Y Lu
(74) *Attorney, Agent, or Firm* — Lex IP Meister, PLLC

(57) ABSTRACT

The present disclosure provides a method for training a neural network that extracts a feature of an image by using data related to a difference between image, and an apparatus using the same. A neural network training method performed by a computing device according to an exemplary embodiment of the present disclosure includes: acquiring a reference image photographed with a first setting with respect to an object and a first comparison image photographed with a second setting with respect to the object; acquiring feature data of the reference image from a first neural network trained by using the reference image; acquiring feature data of a first extract image from a second neural network, wherein the second neural network is trained by using the first extract image formed from data related to a difference between the reference image and the first comparison image; and training a third neural network by using the feature data of the reference image and the feature data of the first extracted image.

18 Claims, 16 Drawing Sheets

(56) References Cited

OTHER PUBLICATIONS

Gustavo Carneiro et al., "Automated Analysis of Unregistered Multi-View Mammograms With Deep Learning", IEEE Transactions on Medical Imaging, vol. 36, No. 11, Nov. 2017, pp. 2355-2365.

Krzysztof J. Geras et al., "High-Resolution Breast Cancer Screening with Multi-View Deep Convolutional Neural Networks", arXiv, Jun. 28, 2018, arXiv:1703.07047v3.

* cited by examiner

METHOD FOR NEURAL NETWORK TRAINING USING DIFFERENCES BETWEEN A PLURALITY OF IMAGES, AND APPARATUS USING THE METHOD

CROSS-REFERENCE TO RELATED APPLICATION

This application claims priority to and the benefit of Korean Patent Application No. 10-2019-0038145 filed in the Korean Intellectual Property Office on Apr. 2, 2019, the entire contents of which are incorporated herein by reference.

BACKGROUND

(a) Field

The present disclosure provide a method for neural network training for extracting a feature of an image by using data of differences between a plurality of images. More particularly, it relates to a method for training a neural network by using data including information on a difference between a plurality of images, and a plurality of images.

(b) Description of the Related Art

A 3D Convolutional Neural Network (CNN) is commonly used to extract features of 3D data. But effectiveness of the 3D CNN is very low because a large amount of memory and time are required for training the 3D CNN.

In order to reduce computing resources consumed to extract the features of the 3D data, a method of extracting the features of the 3D data using a 2D CNN may be considered. However, when extracting the features of 3D data using the 2D CNN, all information about the 3D data (e.g., time of image data or depth of 3D object, etc.) cannot be utilized.

The above information disclosed in this Background section is only for enhancement of understanding of the background of the invention and therefore it may contain information that does not form the prior art that is already known in this country to a person of ordinary skill in the art.

SUMMARY

The present disclosure provides a method for training a neural network that precisely extracts features of a 3D object with low cost, and an apparatus or system using the same.

The present disclosure provides a method for training a neural network that extracts features of an image using data on a difference between a plurality of images, an apparatus or system using the same.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

According to some exemplary embodiments of the present disclosure, a neural network training method performed by a computing device may comprise acquiring a reference image photographed with a first setting with respect to an object and a first comparison image photographed with a second setting with respect to the object; acquiring feature data of the reference image from a first neural network trained by using the reference image; acquiring feature data of a first extract image from a second neural network, wherein the second neural network is trained by using the first extract image formed from data related to a difference between the reference image and the first comparison image; and training a third neural network by using the feature data of the reference image and the feature data of the first extracted image.

The second neural network may be trained by further using depth information of the reference image, depth information of the first comparison image, and the first extracted image.

The neural network training method may further comprise acquiring a second comparison image photographed with a third setting with respect to the object; and acquiring feature data of a second extracted image from a fourth neural network, wherein the fourth neural network is trained by using the second extracted image formed from data related to a difference between the reference image and the second comparison image. Training the third neural network may comprises training the third neural network by using the feature data of the reference image, the feature data of the first extracted image, and the feature data of the second extracted image.

The fourth neural network may be trained by further using depth information of the reference image, depth information of the second comparison image, and the second extracted image.

The first setting, the second setting, and the third setting may have different photographing directions. A photographing direction of the second setting and a photographing direction of the third setting may be symmetrical with reference to a photographing direction of the first setting.

Training the third neural network may comprise training the third neural network by using the feature data of the first image assigned with a first weight value, the feature data of the first extracted image assigned with a second weight value, and the feature data of the second extracted image assigned with a third weigh value.

The first weight value may be greater than the second weight value and the third weight value.

The second weight value and the third weight value may be equivalent to each other.

The third neural network may comprise a layer that fuses the feature data of the reference image and the feature data of the first extracted image.

The neural network training method may further comprises acquiring a new reference image photographed with a setting that is different from the first setting with respect to the object and a new comparison image photographed with respect to the object corresponding to the new reference image; acquiring feature data of the new reference image from the first neural network trained by using the new reference image; acquiring feature data of a newly extracted image from the second neural network, wherein the second neural network is trained by using the newly extracted image formed from data related to a difference between the new reference image and the new comparison image; and training the third neural network by using the feature data of the new reference image and the feature data of the newly extracted image.

According to some exemplary embodiments of the present disclosure, a computer program stored in a computer readable medium, executed, in combination with a computer, for: acquiring a reference image photographed with reference to a first setting with respect to an object and a first comparison image photographed with respect to a second setting with respect to the object; acquiring feature data of the reference image from a first neural network trained by using the reference image; acquiring feature data of a first extracted image from a second neural network, wherein the second neural network is trained by using the first extract image formed from data related to a difference between the reference image and the first comparison image; and training a third neural network by using the feature data of the reference image and the feature data of the first extracted image.

Acquiring the feature data of the first extracted image may further comprise acquiring a second comparison image photographed with a third setting with respect to the object; and acquiring feature data of a second extracted image from a fourth neural network. The fourth neural network may be trained by using the second extracted image formed from data related to a difference between the reference image and the second comparison image. Training the third neural network may comprise training the third neural network by using the feature data of the reference image, the feature data of the first extracted image, and the feature data of the second extracted image.

The fourth neural network may be trained by further including depth information of the reference image, depth information of the second comparison image, and the second extracted image.

The first setting, the second setting, and the third setting may have different photographing directions. A photographing direction of the second setting and a photographing direction of the third setting may be symmetrical with reference to a photographing direction of the first setting.

According to some exemplary embodiments of the present disclosure, a machine training apparatus comprise a memory that stores one or more instructions; and a processor, by executing the one or more instructions, that acquires a reference image photographed with a first setting with respect to an object and a first comparison image photographed with a second setting with respect to the object by performing the stored one or more instructions, acquires feature data of the reference image from a first neural network trained by using the reference image, acquires feature of a first extracted image from a second neural network, wherein the second neural network is trained by using the first extract image formed from data related to a difference between the reference image and the first comparison image, and trains a third neural network by using the feature data of the reference image and the feature data of the first extracted image.

The processor may acquire a second comparison image photographed with a third setting with respect to the object, acquire feature data of a second extracted image from a fourth neural network, wherein the fourth neural network is trained by using the second extract image formed from data related to a difference between the reference image and the second comparison image, and train the third neural network by using the feature data of the reference image, the feature data of the first extracted image, and the feature data of the second extracted image.

The processor may train the third neural network by using the feature data of the reference image assigned with a first weight value, the feature data of the first extracted data assigned with a second weight value, and the feature data of the second extracted image assigned with a third weight value.

The second weight value and the third weight value may be equivalent to each other.

DETAILED DESCRIPTION OF THE EMBODIMENTS

Figure 1:
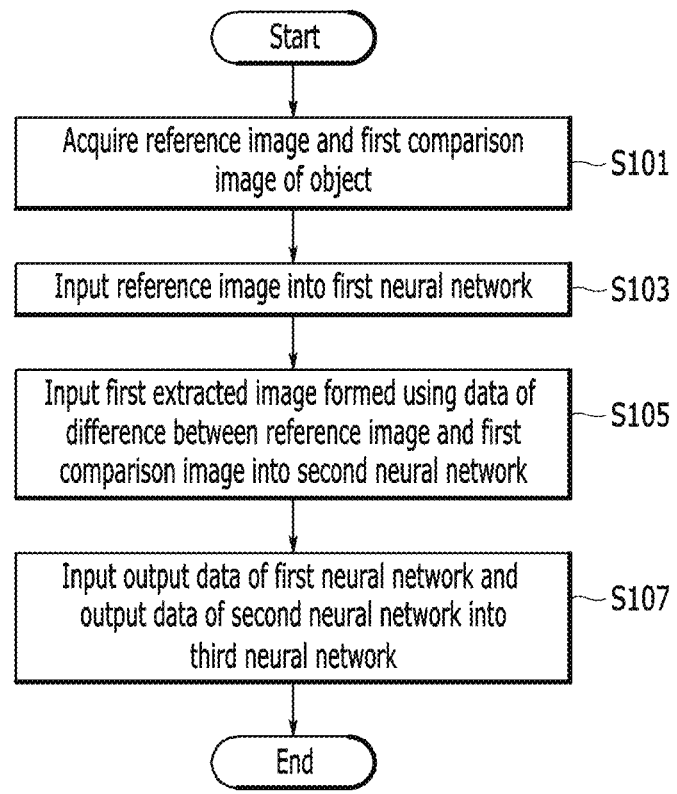
FIG. 1 is a flowchart of a neural network training method using one reference image and one extracted image according to an exemplary embodiment of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to the person of ordinary skill in the art, and the present disclosure will only be defined by the appended claims. Like reference numerals designate like elements throughout the specification.

In adding reference numerals to elements of each drawing, like reference numerals designate like elements throughout the specification. In describing the embodiments of the present disclosure, a detailed description of pertinent known constructions or functions will be omitted if it is deemed to make the gist of the present disclosure unnecessarily vague.

Unless otherwise defined, all terms (including technical and scientific terms) used herein have the same meaning as commonly understood by the person of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms "a", "an" and "the" are intended to include the plural forms as well, unless the context clearly indicates otherwise.

In addition, in describing the constituent elements of the present disclosure, terms such as first and second may be used. These terms are only to distinguish the constituent elements from other constituent elements, and the terms do not limit the nature or order of the constituent elements.

Hereinafter, referring to FIG. 1, a neural network training method according to an exemplary embodiment of the present disclosure will be described. In order to extract a feature of an object (a subject), a neural network training method according to the present exemplary embodiment uses a plurality of photographed images of the object. That is, the features of the object are extracted using one reference image and one extracted image of the object. In this case, the extracted image is an image formed based on a difference between a comparison image of the object and the reference image. The comparison image of the object is photographed with a different shooting setting from that of the reference image. The photographed image may be referred to as a taken image, a captured image and so on.

The neural network training method according to the present exemplary embodiment may be performed by a computing device. The computing device may receive a plurality of image datasets which are obtained by photographing the same object with different settings, as training data. The computing device may generate data defining neural networks trained as a result of the neural network training method. Hereinafter, in describing each operation in the method according to the present exemplary embodiment, when description of the subject is omitted, the subject of the operation may be understood as the computing device.

In step S101, a reference image and a first comparison image with respect to an object to be photographed are acquired. The reference image and the first comparison image are data acquired by photographing the same object, but they are different from each other in settings used for the photographing. Hereinafter, the following description will be related to the "settings".

The settings related to the photographing may refer to settings defining an operation method of a photographing apparatus or various photographing environments such as a relative position with respect to the object such as a photographing position or a photographing angle. For example, the operation method of the photographing apparatus may be a radiographic method, a panoramic method, and a tomography method. The photographing environment may include various settings for acquiring different images in the imaging of the same object, such as a camera angle, a distance between an object and a camera, an exposure value, an illumination ratio, a focal length, an angle of view, the radiation dose in the radiographic imaging, and the like.

The reference image and the first comparison image may be images included in a set of 2D images formed for generating a 3D image. That is, the reference image and the first comparison image may be 2D images for generating the 3D image rather than 3D images themselves. The 3D image may be a computerized tomography (CT) image, a digital breast tomosynthesis (DBT) image, or a multi-layer panoramic dental image, which are used in medical imaging. When the reference image and the first comparison image are included in the set of 2D images formed for generating a 3D image of an object, the reference image and the first comparison image may be photographed at different angles or may be focused at different depths of the object based on the same photographing direction.

In step S103, the acquired reference image is input to a first neural network.

Here, the first neural network is a neural network that outputs feature data extracted from image data input to the first neural network. For example, the first neural network may be one of various 2D convolutional neural networks (CNNs) such as a ResNet, a VGGNet, or an AlexNet.

In step S105, a first extracted image formed by using the reference image and the first comparison image may be input to a second neural network.

The first extracted image may be a data-based image formed based on information on a difference between the reference image and the first comparison image. For example, the first extracted image may be an image formed based on a pixel value difference between the reference image and the first comparison image. That is, a pixel value at a first coordinate of the first extracted image may be obtained by subtracting a pixel value at the first coordinate of the first comparison image from a pixel value at the first coordinate of the reference image.

In addition, according to another exemplary embodiment of the present disclosure, depth information of the reference image and depth information of the first comparison image may be further input to the second neural network. The second neural network is a neural network that outputs feature data extracted from image data input to the second neural network.

In the exemplary embodiment, the first neural network and the second neural network may be configured with the same setting. That is, the first neural network and the second neural network may have completely the same settings related to neural network configuration such as the number of layers, the number of nodes of each layer, and a predetermined connection between nodes of adjacent layers. In addition, when the first neural network and the second neural network are 2D CNNs, the type and number of filters used in the first neural network and the second neural network and the order of applying each filter may also be the same.

In another exemplary embodiment, the reference image input to the first neural network is an intact image corresponding to a specific depth of the object, whereas the first extracted image input to the second neural network only provides information on the difference between the reference image and the first comparison image. Thus the first neural network and the second neural network may differ from each other in at least some of the settings.

The first extracted image contains only information on the difference between the reference image and the first comparison image. Therefore, in order to compensate for the fact that the information input to the second neural network is relatively weak compared to that of the first neural network, information on the difference between the depth of the first comparison image and the depth of the reference image may be further input to the second neural network. As a result, the features of the object positioned in the 3D space can be more accurately identified compared to when only the first extracted image is used as input data of the first neural network.

Depth information may refer to information that is extinguished in addition to the width and height when the 3D object is photographed as a 2D image. For example, the depth information may mean information of a distance from the photographing point to each area of the object.

In addition, when a plurality of slice images having different depths according to the photographing direction are input images of the neural network, the depth information may be represented in the form of serial numbers of the respective slice images. For example, when a body is photographed from the front, but 20 slice images are taken at different focal lengths, and a consecutive serial number is assigned from the foremost slice image toward the rearmost slice image, the depth information may imply the serial number.

In step S107, output data of the first neural network and output data of the second neural network are input to a third neural network, so the third neural network can be trained.

The output data of the first neural network is feature data of the reference image, and the output data of the second neural network is feature data of the first extracted image. For example, feature data output from the first neural network may be a feature map of the reference image, and feature data output from the second neural network may be a feature map of the first extracted image.

The third neural network may include a fusion layer that fuses the feature data of the reference image and the feature data of the first extracted image. Feature information of the reference image and feature information of the first extracted image are all reflected to data taken as a result of the "fusion". That is, the 'fusion' can be achieved in various ways in which both the feature information of the reference image and the feature information of the first extracted image can be reflected.

For example, the data output from the fusion layer may be acquired by concatenation of a feature vector of the first extracted image to a feature vector of the reference image, summation of the feature vector of the reference image and the feature vector of the first extracted image, or multiplication of the feature vector of the reference image by the feature vector of the first extracted image.

In addition, the third neural network is a fusion network, which can be replaced by various types of neural networks that can be modified by those skilled in the art. For example, the third neural network may be a tensor fusion network.

In addition, the third neural network according to the exemplary embodiment further includes a fully connected layer such that various tasks such as classification, clustering, and the like can be carried out.

Figure 2:
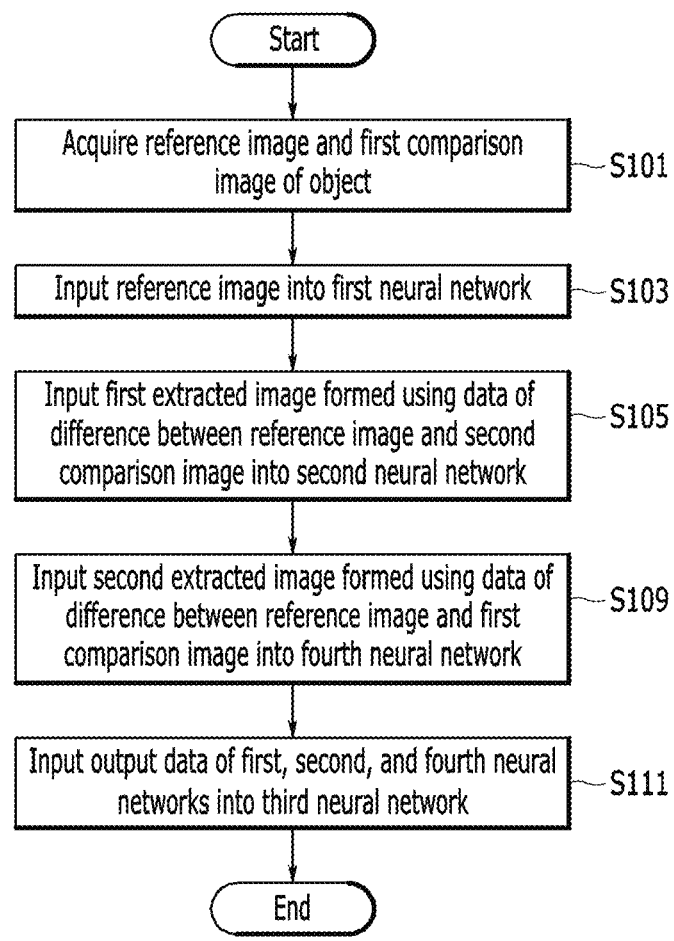
FIG. 2 is a flowchart of a neural network training method using one reference image and a plurality of extracted images according to another exemplary embodiment of the present disclosure.

Hereinafter, referring to FIG. 2, a method for training a neural network by using one reference image and a plurality of extracted images according to another exemplary embodiment will be described. In the exemplary embodiment described with reference to FIG. 1, one reference image and one comparison image are used in training of the neural network. On the other hand, in the exemplary embodiment described with reference to FIG. 2, one reference image and two comparison images are used in training a neural network to extract features of an object by using much more information on the object. In this case, each of the two comparison images is an image of an object photographed with different settings. The neural network training method according to the present exemplary embodiment may be modified by using three or more comparison images photographed by different settings.

In order to avoid duplicate description, the description of step S101 to step S105 is omitted.

In step S109, a second extracted image is acquired by using a second comparison image, and the second extracted image is input to a fourth neural network. The second extracted image is an image formed by data with respect to a pixel value difference between the second comparison image and the reference image. The fourth neural network outputs feature data of the second extracted image. Similar to what has already been described with respect to the first extracted image, information on the difference between a depth of the second comparison image and a depth of the reference image may be input to the fourth neural network along with the second extracted image.

The second comparison image is an image of the object photographed with a different setting from the first comparison image. For example, a depth difference between the first comparison image and the reference image may be the same as a depth difference between the second comparison image and the reference image. For example, when a series of slice images IMAGE[0, 1, . . . , N] of an object are taken at different depths according to a photographing direction, a stride 's' between a reference image IMAGE[i] and a first comparison image IMAGE[i+1s] may be the same as a stride 's' between the reference image and a second comparison image IMAGE[i−s]. That is, the first comparison image IMAGE[i+s] and the second comparison image IMAGE[i−s]) are symmetrical in depth with respect to the reference image IMAGE[i].

In the exemplary embodiment, the first neural network, the second neural network, and the fourth neural network may be formed with the same settings. That is, the first neural network, the second neural network, and the fourth neural network may have completely identical settings related to neural network configuration such as the number of layers, the number of nodes of each layer, and the predetermined connection between nodes of adjacent layers. In addition, when the first neural network, the second neural network, and the fourth neural network are 2D CNNs, the type and number of filters used in the first neural network, the second neural network, and the fourth neural network, and the order of applying each filter, may also be the same.

In another exemplary embodiment, the reference image input to the first neural network is an intact image corresponding to a specific depth of the object, while the first extracted image input to the second neural network and the second extracted image input to the fourth neural network contain only information on the difference with the reference image. Thus the first neural network and the second neural network are at least partially different from each other in settings, and the first neural network and the fourth neural network may be at least partially different from each other in settings. However, in this case, the first extracted image and the second extracted image are also images that contain information on only the difference with the reference image, and thus the second neural network and the fourth neural network may be formed with the same settings.

Meanwhile, extracted images formed of information related to a difference value between the reference image and the respective comparison images all may be input to the same neural network. For example, a plurality of extracted images may be input to the same neural network. As an exemplary embodiment, both the first extracted image and the second extracted image may be input to the second neural network.

Even when feature data of the first extracted image and feature data of the second extracted image are obtained by the same neural network, the feature data of the first extracted image, the feature data of the second extracted image, and the feature data of the reference image may all be input in parallel with each other into a third neural network. In this case, the third neural network may fuse the feature data of the first extracted image input from the second neural network, the feature data of the second extracted image input from the second neural network, and the feature data of the reference image input from the first neural network.

Since output data of each of the first neural network, the second neural network, and the fourth neural network are input to the third neural network in step S111, the feature data of the reference image, the feature data of the first extracted image, and the feature data of the second extracted image are fused altogether in the third neural network, and a task such as classification can be further carried out by using a fused feature.

Figure 3:
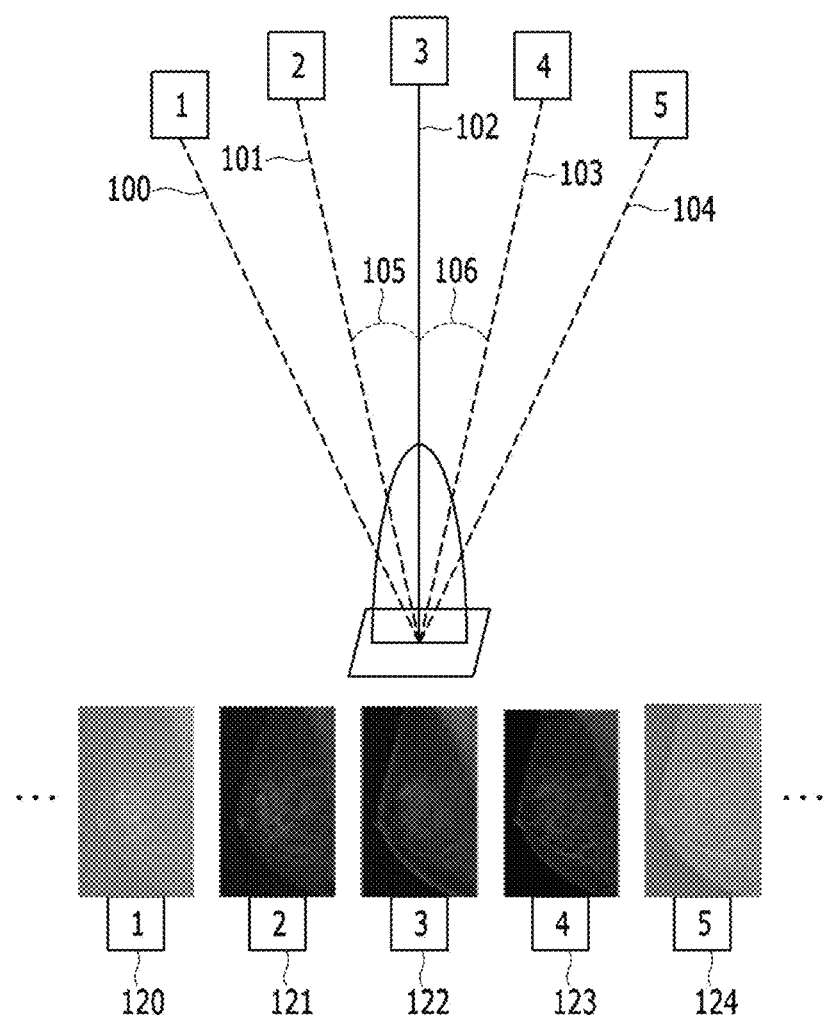
FIG. 3 is a schematic view provided for describing a process for acquiring images of an object photographed with various settings in a neural network training method using the images of the object according to another exemplary embodiment of the present disclosure.

Referring to FIG. 3, a plurality of images of an object photographed by various settings will be described in detail. By varying the settings related to the photographing of the object, various reference images and comparison images can be obtained.

"Settings" related to photographing of the first comparison image and "settings" related to photographing of the second comparison image according to several exemplary embodiments of the present disclosure may be information on a camera angle. For example, when the reference image is an image 122 acquired with a third setting 102, the first comparison image and the second comparison image can be acquired by photographing with camera angles of the same value, while having different directions. Thus, when a camera angle 105 of a second setting 101 and a camera angle 106 of a fourth setting 103 are the same with reference to a straight line 102 between a camera position where the reference image 122 is photographed and the object, an image 121 acquired by the second setting 101 and an image 123 acquired by the fourth setting 103 may be designated as a first comparison image and a second comparison image, respectively.

Similarly, when a camera angle of a first setting 100 and a camera angle of a fifth setting 104 are the same with reference to the straight line 102 between the camera position where the reference image 122 is photographed and the object, an image 120 acquired by the first setting 100 and an image 124 acquired by the fifth setting 104 may be designated as a first comparison image and a second comparison image, respectively. In addition, the number of comparison images is not limited to two, and therefore, four or more comparison images including the image 120 acquired by the first setting 100, the image 121 acquired by the second setting 101, the image 123 acquired by the fourth setting 103, and the image 104 acquired by the fifth setting 104 may be acquired.

A plurality of extracted images are obtained based on each of the plurality of comparison images using the plurality of obtained comparison images, thereby generating abundant neural network training data using the multiple combinations of the plurality of extracted images.

Also, in some exemplary embodiments of the present disclosure, the extracted image and depth information corresponding to the extracted image may be further used for training the neural network. In this case, the depth information corresponding to the extracted image according to the exemplary embodiment may be an angle difference between the straight line between the camera position where the reference image is photographed and the object and the straight line between the camera position where the image is photographed and the object.

Figure 4:
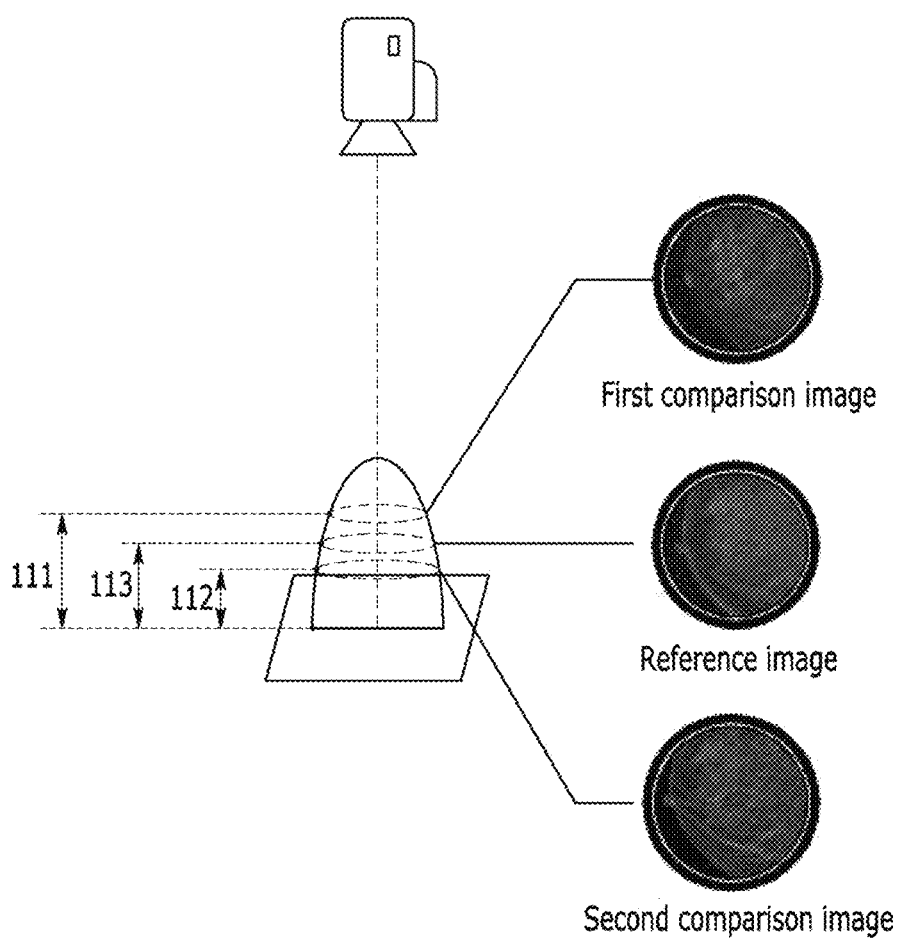
FIG. 4 is a schematic view provided for description of a neural network training method using depth information of images of an object and the images of the object according to another exemplary embodiment of the present disclosure.

As shown in FIG. 4, the depth information may be information about a height difference from a predetermined reference plane to a specific tomographic plane of the object. Thus, the reference image, the first comparison image, and the second comparison image may be designated such that a difference between a height 113 of the object corresponding to the reference image and a height 111 of the object corresponding to the first comparison image can be the same as a difference between the height 113 of the object corresponding to the reference image and a height 112 of the object corresponding to the second comparison image.

Hereinafter, a method for acquiring a reference image and a comparison image in a plurality of images acquired according to a setting change of continuous photographing will be described with reference to FIG. 5.

For example, a plurality of 2D images 210 may be obtained by continuously adjusting a photographing angle of an object, and one 2D image of the plurality of obtained 2D images 210 may be designated as a reference image.

The reference image according to an exemplary embodiment may be designated as an image including the most information about an object among a plurality of images. However, in order to secure various neural network training data, each of the plurality of images 210 may be designated as a reference image for each task and used for neural network training.

When the neural network training task is repeated in some exemplary embodiments of the present disclosure, a training process of the same neural network may be repeated using a reference image that is different from the reference image used in the previous neural network training. For each repeated neural network training process, a reference image including information about an object that could not be acquired in the previous neural network training process is newly designated, and the neural network can be trained using an extracted image associated with each reference image.

In this case, not only information about various objects included in each reference image but also information about an extracted image that is changed according to the reference image may be used for neural network training to form a more advanced neural network.

After the reference image 201 is designated, at least one of comparison images 202, 203, 204, and 205 that are different from the reference image 201 may be designated. According to an exemplary embodiment, one reference image and one comparison image may be designated to obtain one extracted image, or one reference image and two or more comparison images may be designated to obtain one extracted image.

Figure 5:
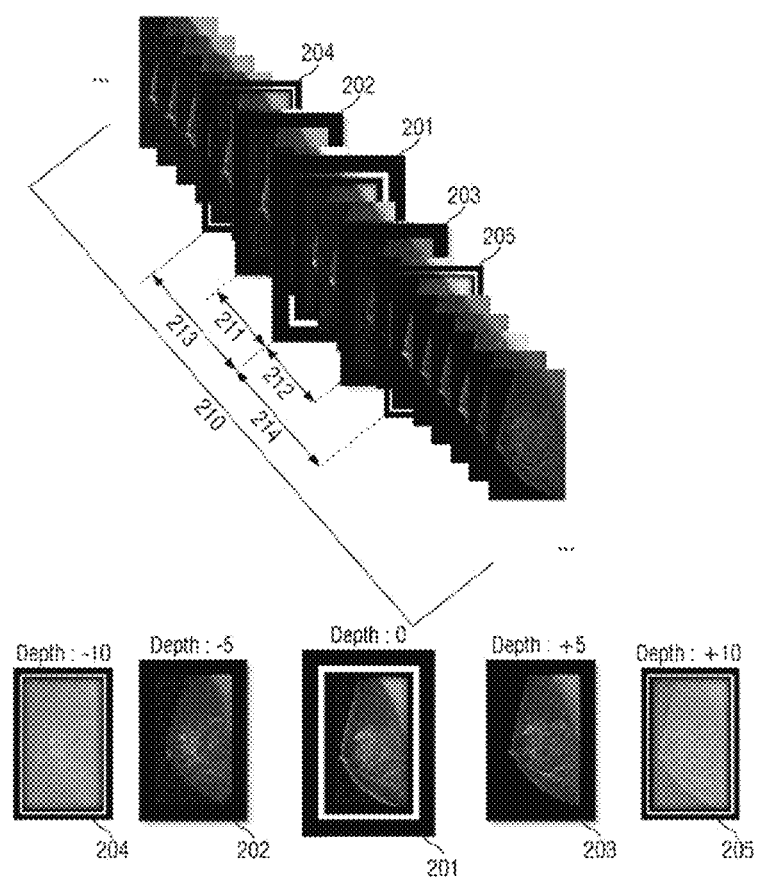
FIG. 5 is a schematic view provided for description of a method for designating a reference image and a comparison image in a neural network training method using a reference image and a comparison image according to another exemplary embodiment of the present disclosure.

As shown in FIG. 5, the plurality of images 210 corresponding to each of the plurality of pieces of depth information of the object may be arranged based on the depth information. According to the exemplary embodiment, when the reference image 201 corresponding to the depth '0' of the object is obtained, the first comparison image corresponding to the depth '−5 (211)' of the object 202 and the second comparison image 203 corresponding to the depth '+5 (212)' of the object may be designated to have the same depth difference as that of the reference image 201, respectively.

According to another exemplary embodiment, several pairs of comparison images 202, 203, 204, and 205 having various depth information with the reference image 201 may be used to obtain the extracted image. For example, when the reference image 201 corresponding to the depth '0' of the object is obtained, the image 202 corresponding to the depth '−5 (211)' of the object and the image 203 corresponding to the depth '+5 (212)' of the object can be respectively obtained as a pair of a first comparison image and a second comparison image, and the image 204 corresponding to the depth '−10 (213)' of the object and the image 205 corresponding to the depth '+10 (214)' of the object may also be further obtained as a pair of a first comparison image and a second comparison image, respectively.

Hereinafter, a method for acquiring an extracted image by using a reference image and a comparison image will be described with reference to FIG. 6.

An extracted image may be an image formed based on a comparison image having depth information different from a reference image. The extracted image according to the exemplary embodiment can be acquired by using a pixel value difference between the reference image and the comparison image. In another exemplary embodiment, the extracted image may be obtained by taking an absolute value of the difference in pixel values between the reference image and the comparison image. Therefore, the extracted image may be referred to as a difference image. The extracted image may be a black-white image generated based on the numerical value converted to the absolute value.

When one reference image and one comparison image are acquired according to an exemplary embodiment, one extracted image may be obtained based on a difference between the reference image and the comparison image.

Figure 6:
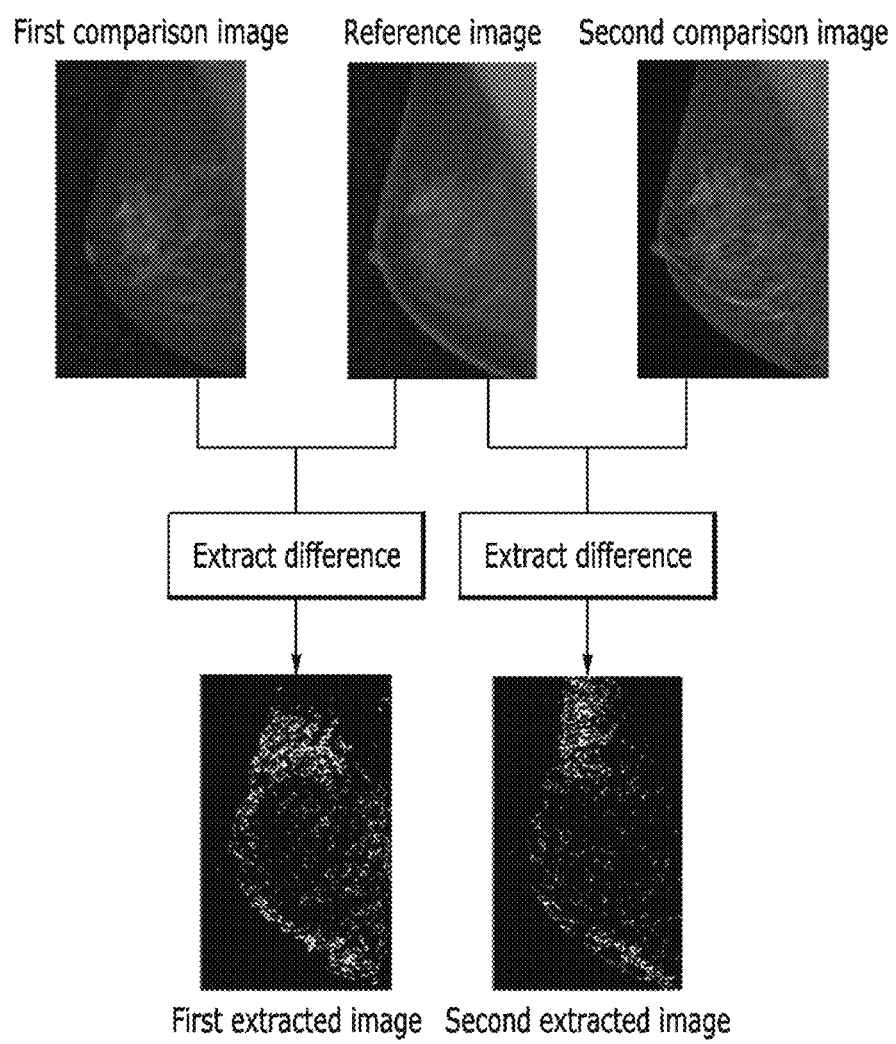
FIG. 6 is a schematic view provided for description of a method for acquiring an acquired image by using a reference image and a comparison image in a neural network training method using a reference image and an extracted image according to another exemplary embodiment of the present disclosure.

When one reference image and two comparison images are acquired as shown in FIG. 6 according to another exemplary embodiment, a first extracted image and a second extracted image may be obtained based on a difference between the reference image and the first comparison image and a difference between the reference image and the second comparison image, respectively.

Instead of inputting the comparison image to the neural network so as to be used for the neural network training, the extracted image is input to the neural network and used for the neural network training, so that depth information of an object that cannot be obtained only by the reference image and the comparison image can be further used for neural network training.

Figure 7:
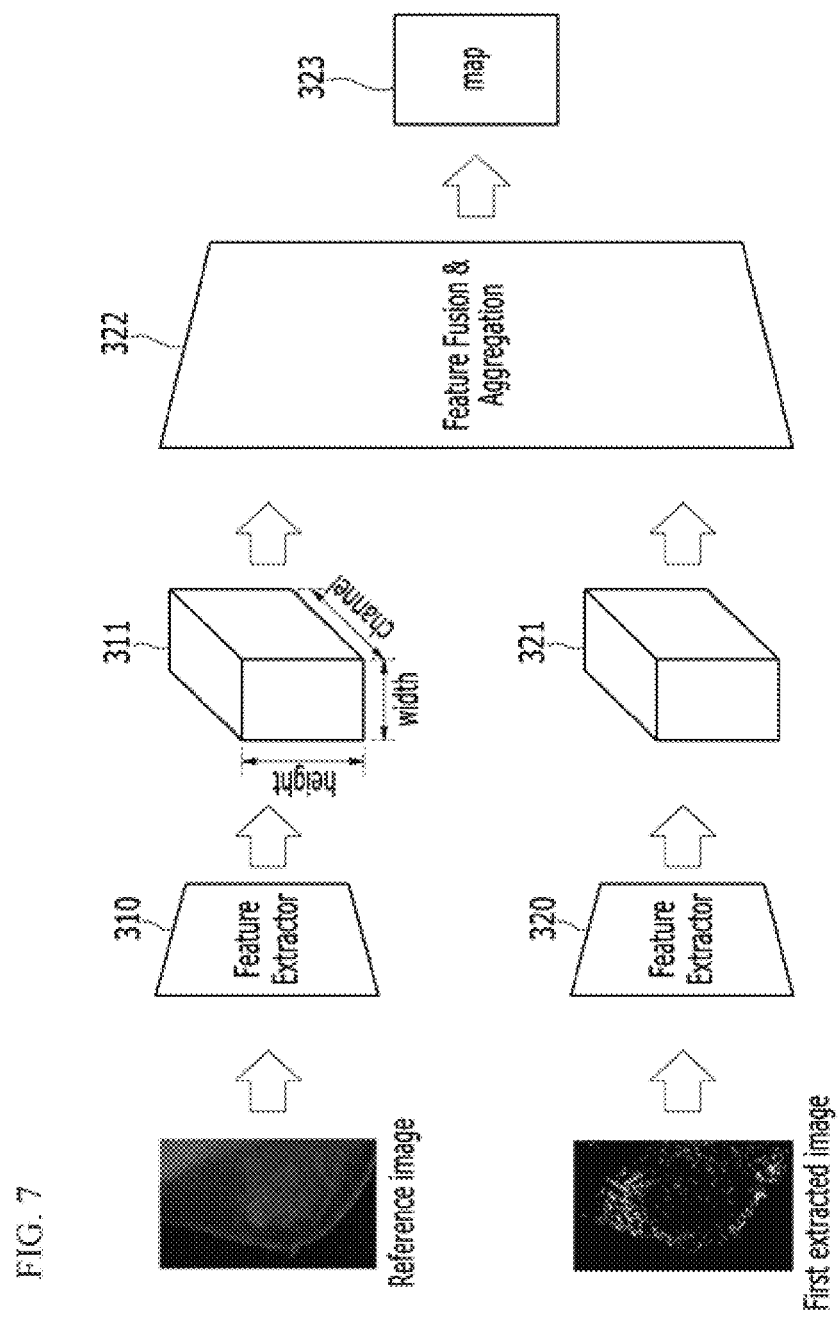
FIG. 7 is provided for description of a neural network training method using a reference image and one extracted image according to another exemplary embodiment of the present disclosure.

Hereinafter, referring to FIG. 7, a configuration of a feature extraction neural network by using one reference image and one extracted image will be described in detail.

First, feature data 311 of a reference image may be acquired by using a first neural network 310, and feature data 321 of a first extracted image may be acquired by using a second neural network 320. The first neural network 310 and the second neural network 320 may be referred to as a feature extractor. The feature data 311 of the reference image and the feature data 321 of the first extracted image may be data including information on width, height, and channel values. Alternatively, the feature data 311 of the reference image and the feature data 321 of the first extracted image feature data 321 may be a feature data feature map output from the first neural network and the second neural network.

Next, the feature data 311 of the reference image and the feature data 321 of the first extracted image may be input to a third neural network 322 that fuses the feature data 311 and 312. The third neural network 322 may perform the feature fusion and aggregation. The third neural network 322 may output a task result map 323 indicating a result of a task performed by using a feature of an object.

Figure 8:
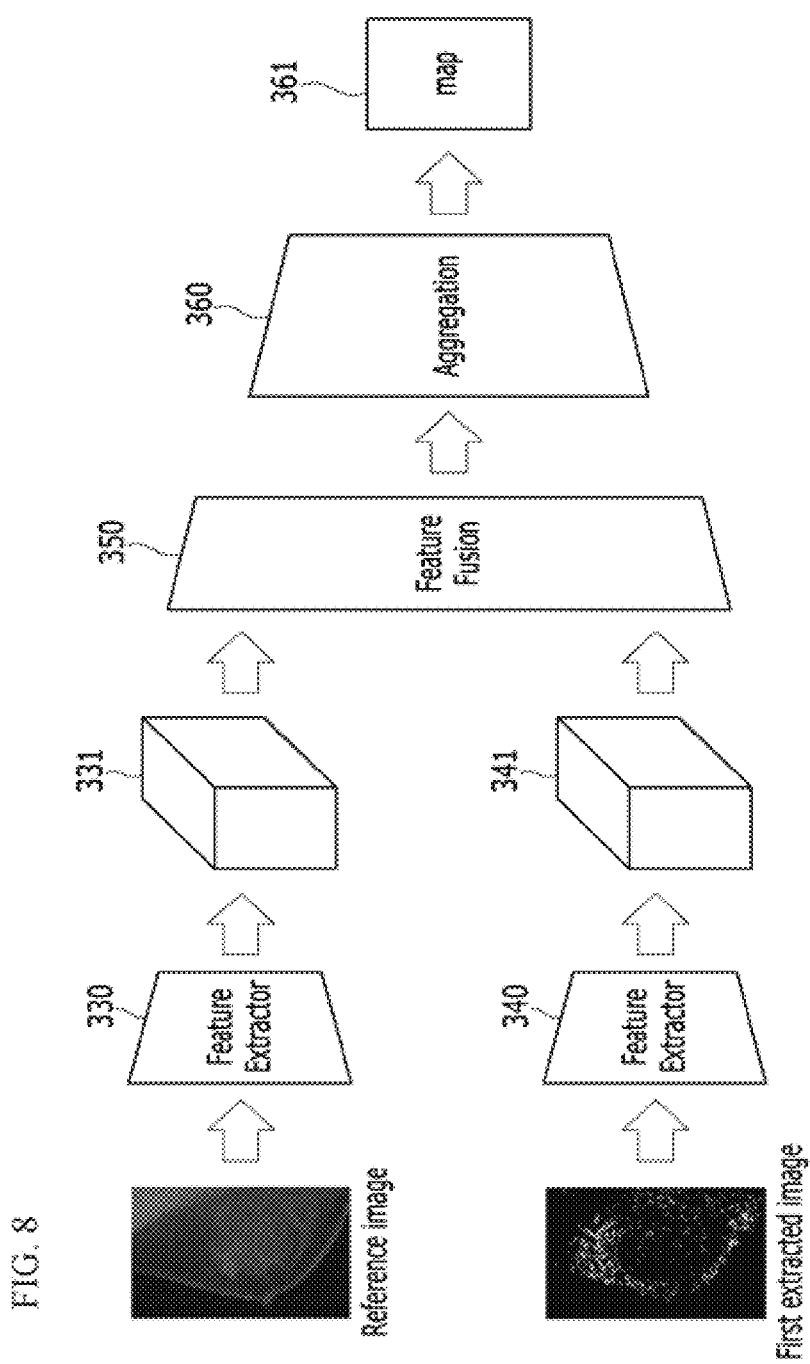
FIG. 8 is provided for description of a neural network training method including a neural network that outputs data related to features of an object by using feature data of one reference image and feature data of one extracted image according to another exemplary embodiment of the present disclosure.

As shown in FIG. 8, a task result map 361 is outputted from a neural network 360. The neural network 360 may receive feature data output from a neural network 350 that fuses feature data 331 output from a first neural network 330 and feature data 341 output from a second neural network 340, and perform a task such as classification. The first neural network 320 and the second neural network 340 may be referred to as a feature extractor, the neural network 350 may perform the feature fusion, and the neural network 360 may perform the aggregation.

The task result map 361 is data indicating information related to a feature of an object that can be extracted using feature data of a 2D image of an object. For example, the task result map 361 may be data indicating whether cancer of the human body is detected by using a tomography image of the human body.

Figure 9:
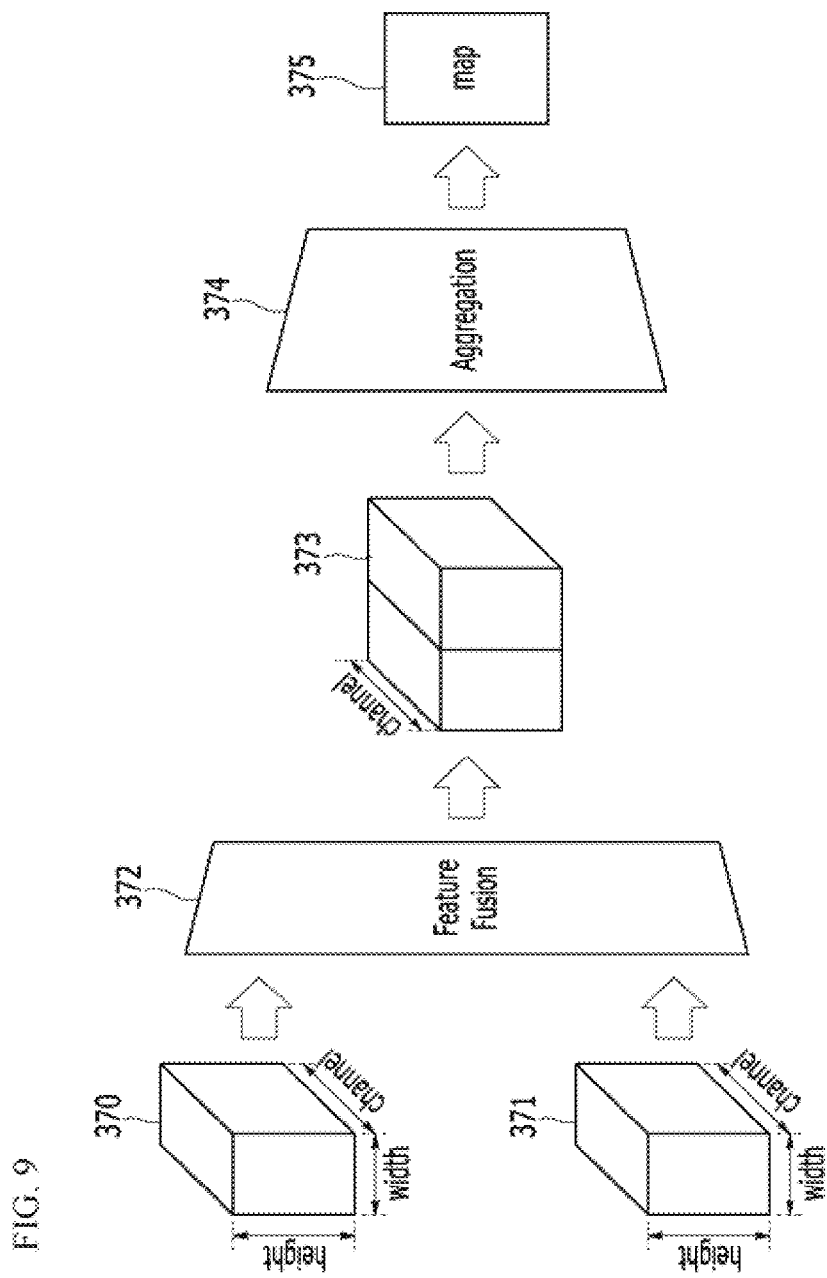
FIG. 9 is provided for description of a neural network training method that extracts features of an object by using feature data of a reference image and data connected with feature data of an extracted image with reference to a channel axis according to another exemplary embodiment of the present disclosure.

Hereinafter, a method for fusing feature data will be described in detail with reference to FIG. 9 and FIG. 10. As shown in FIG. 9, a neural network 372 may receive a plurality of feature data, and generate data 373 as a result of feature data fusion. The data 373 is that the plurality of feature data 370 and 371 are concatenated with respect to a channel axis.

Figure 10:
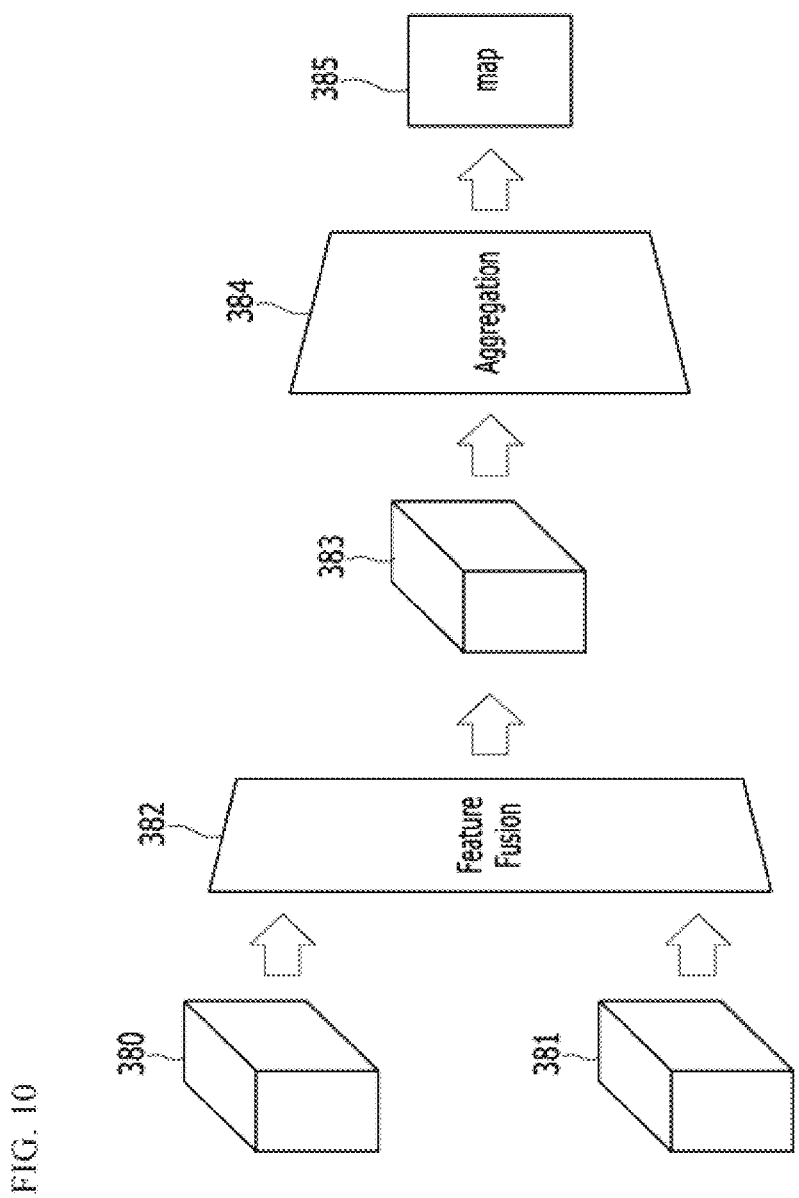
FIG. 10 is provided for description of a neural network training method that extracts features of an object by using data formed by fusing feature data of a reference image and feature data of an extracted image according to another exemplary embodiment of the present disclosure.

Alternatively, as shown in FIG. 10, a neural network 382 may receive a plurality of feature data 380 and 381. The neural network 382 may include at least one convolution step and at least one pooling step, and output data 383 having the same size as the input data through operations such as multiplication, addition, and subtraction. The feature data 383 may be obtained as a result of the feature data fusion, and be input to a neural network 384 that can perform one or more of classification and clustering using the feature data. A task result map 385 may be generated from the neural network 384.

Figure 11:
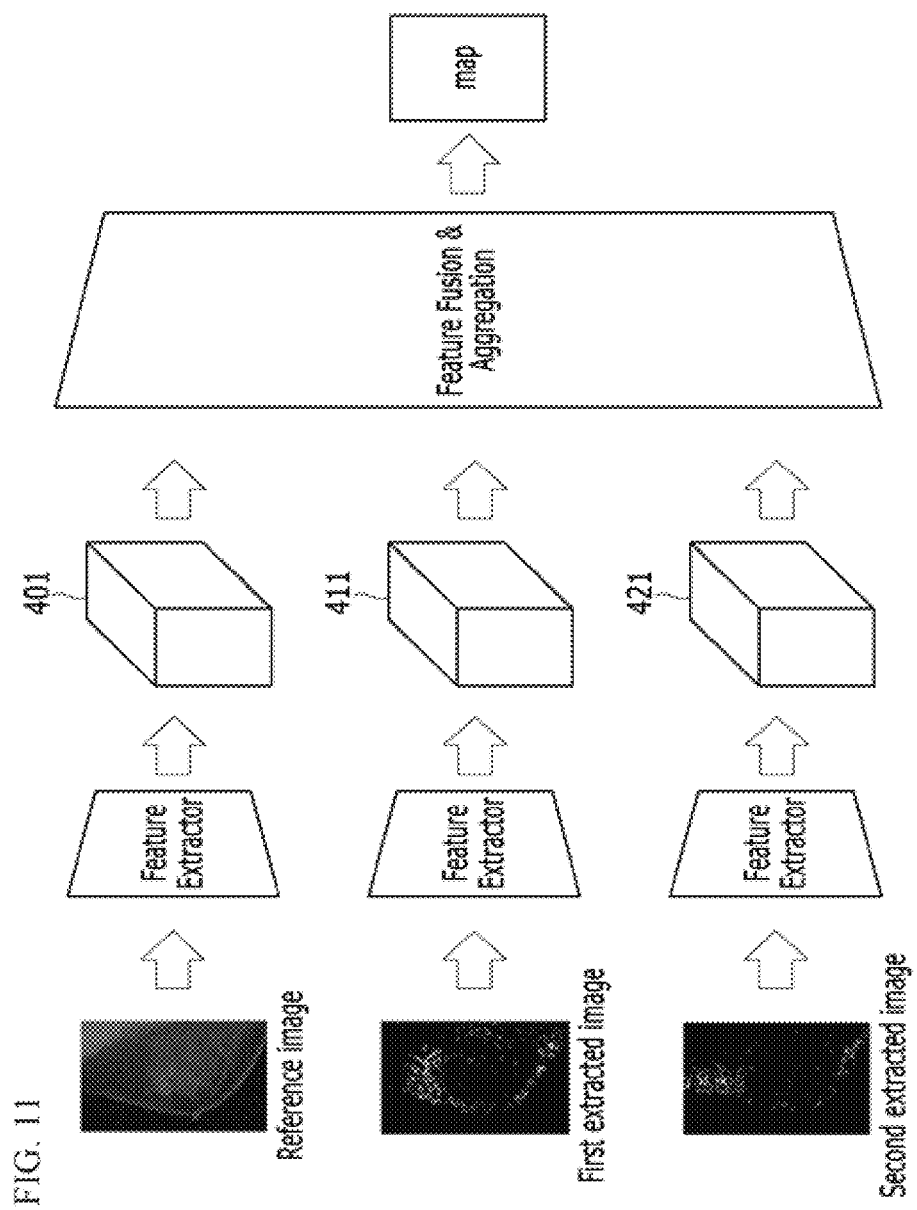
FIG. 11 is provided for description of a method for training an object feature extraction neural network using one reference image and a plurality of extracted images according to another exemplary embodiment of the present disclosure.

According to another exemplary embodiment of the present disclosure as shown in FIG. 11, one reference image and a plurality of extracted images may be used for neural network training.

When the third neural network is trained using feature data 401 of a reference image, feature data 411 of a first extracted image, and feature data 421 of a second extracted image, information on an object included in the reference image, information on an object corresponding to the first extracted image, and information on an object corresponding to the second extracted image may be used for training the third neural network. Depth information of the first extracted image and depth information of the second extracted image may be further used for the third neural network training. As described above, the first extracted image and the second extracted image may be formed based on a first comparison image and a second comparison image that are symmetrical in depth with respect to the reference image, respectively.

Therefore, when both the first extracted image and the second extracted image are used in parallel to train neural network, it is possible to obtain further information, such as information on characteristics of an iteratively existing object according to a certain depth difference, that cannot be acquired from neural network trained using only one extracted image and the reference image.

In addition according to another exemplary embodiment, feature data 401 of the reference image, feature data 411 of the first extracted image, and feature data 421 of the second extracted image may be input to the third neural network with predetermined weight values.

In the exemplary embodiment, the largest weight value may be assigned to the feature data 401 of the reference image.

In another exemplary embodiment, the weight value of the feature data 411 of the first extracted image and the weight value of the feature data 421 of the second extracted image may be greater than the weight value of the feature data 401 of the reference image. In addition, in another exemplary embodiment, the weight value of the feature data 411 of the first extracted image and the weight value of the feature data 421 of the second extracted image may be equally provided. In addition, the weight values of the feature data 401 of the reference image, the feature data 411 of the first extracted image, and the feature data 421 of the second extracted image may be identically designated.

That is, the weight value specified in the feature data of the reference image, the feature data of the first extracted image, and the feature data of the second extracted image may be variously designated according to the feature of the object to be extracted from the neural network.

Figure 12:
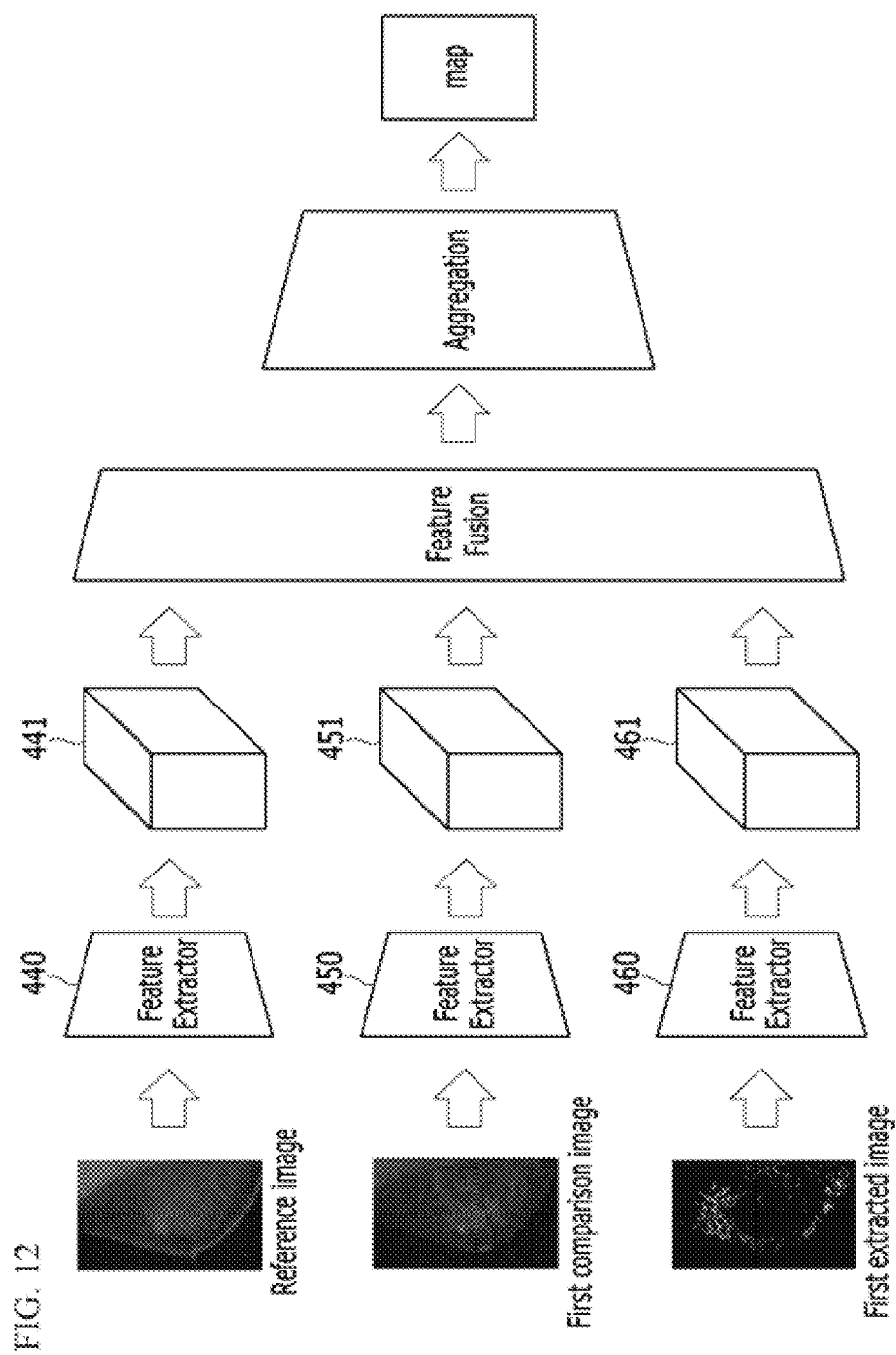
FIG. 12 is provided for description of a method for training an object feature extraction neural network using a reference image, a comparison image, and an extracted image according to another exemplary embodiment of the present disclosure.

Referring to FIG. 12, according to another exemplary embodiment of the present disclosure, a reference image, a first comparison image, and a first extracted image may be used for training neural networks.

When only the reference image and the first extracted image are used as training data for the neural network, excepting the depth information on the object included in the first extracted image, most information on the object may only be obtained from the reference image. Therefore, by using the first comparison image as well as the reference image and the first extracted image, information on an object included only in the first comparison image may be further used for training the neural network. A neural network 440 that receives the reference image according to the present exemplary embodiment may output feature data 441 of the reference image, and a neural network 450 that receives the first comparison image may output feature data 451 of the first comparison image. A neural network 460 that receives the first extracted image may output feature data 461 of the first extracted image.

Figure 13:
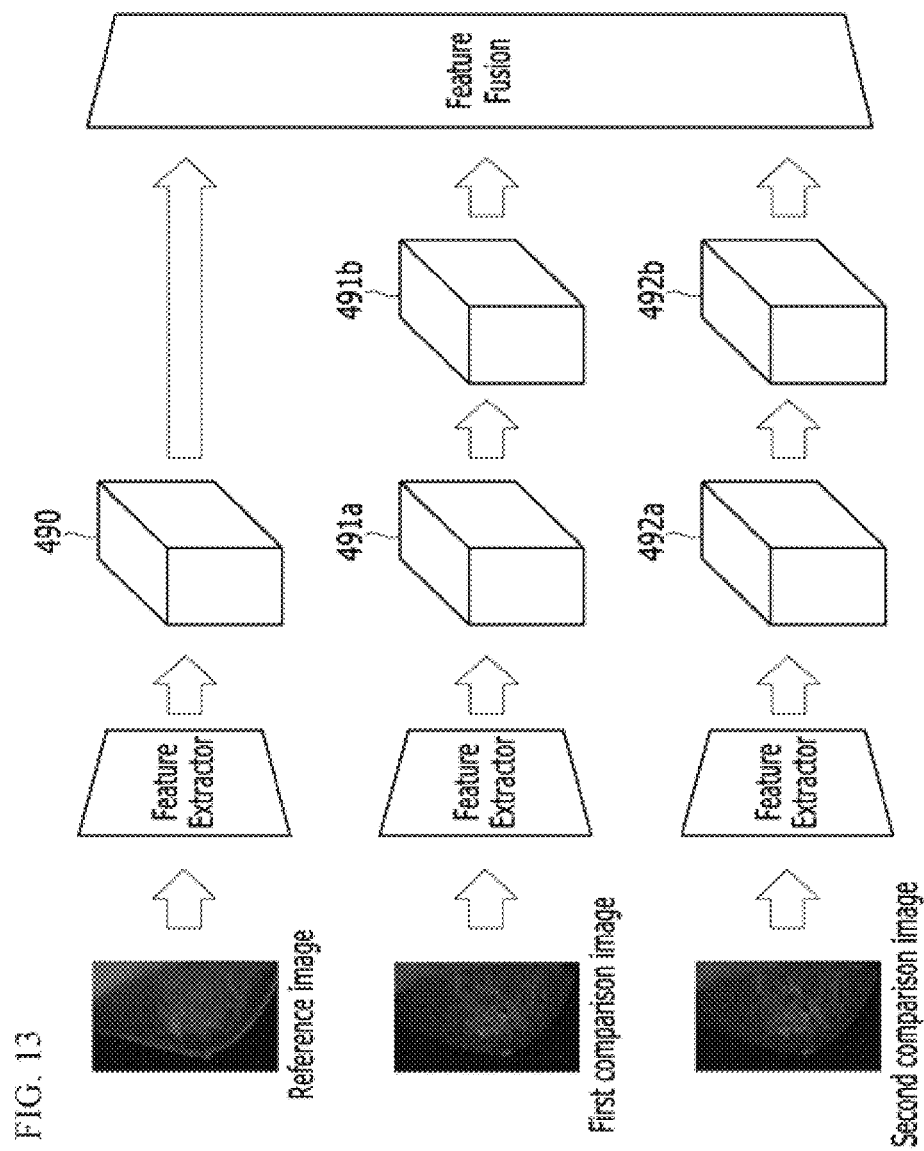
FIG. 13 is provided for description of a method for training an object feature extraction neural network using extracted data formed based on a difference between feature data of a reference image and feature data of a plurality of comparison images according to another exemplary embodiment of the present disclosure.

Referring to FIG. 13, a method of training a neural network using extracted data formed based on a difference between feature data of a reference image and feature data of a comparison image will be described.

According to the present exemplary embodiment, first extraction data 491b may be formed based on a difference between feature data 490 of the reference image and feature data 491a of the first comparison image. Second extraction data 492b may be formed based on a difference between the feature data 490 of the reference image and feature data 492a of the second comparison image.

The difference between the feature data 490 of the reference image and the feature data 491a of the first comparison image and the difference between the feature data 490 of the reference image and the feature data 492a of the second comparison image may be formed based on a subtraction operation of values respectively included in the feature data 490 of the reference image, the feature data 491a of the first comparison image, and the feature data 492a of the second comparison image. Specifically, one or more of the width, height, and the channel value of feature data may be used for the subtraction operation.

In this case, the feature data 490, the first extraction data 491b, and the second extraction data 492b of the reference image may be used as input data of the third neural network extracting the feature of the object.

As such, according to the present disclosure, not only differences between a plurality of images but also differences on a feature space can be extracted. In addition, the neural network training as described above may be performed using the difference extracted on the feature space.

Figure 14:
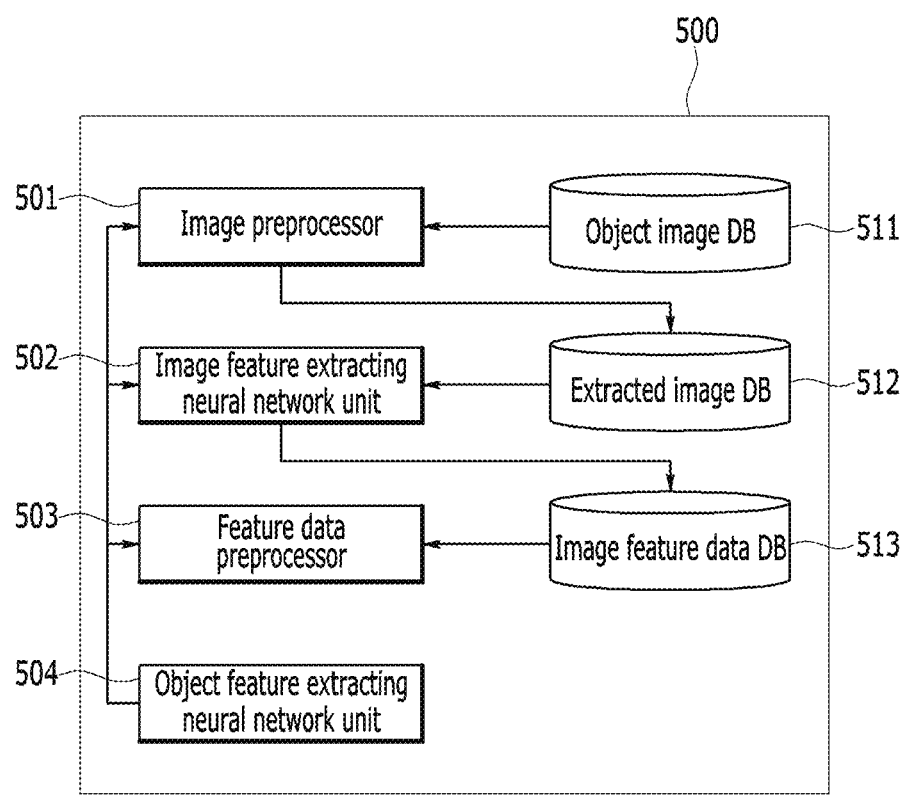
FIG. 14 is a block diagram of a neural network training apparatus according to another exemplary embodiment of the present disclosure.

Hereinafter, operation of a neural network training apparatus will be described in detail with reference to FIG. 14.

A training apparatus 500 according to another exemplary embodiment of the present disclosure may train neural network to extract object feature. The training device 500 may include an image feature extracting neural network unit 502, an object feature extracting neural network unit 504, and an image feature data DB 513, and may further include an image preprocessor 501, a feature data preprocessor 503, an object image DB 511, and an extracted image DB 512 in some exemplary embodiments.

The image preprocessor 501 may receive a reference image and a comparison image from the object image DB 511, and form an extracted image by using a difference between the reference image and the comparison image received from the object image DB 511. According to an exemplary embodiment, the image preprocessor 501 may acquire an extracted image by using a difference in pixel values between the reference image and a comparison image, and acquire extracted data by using a difference in numerical values between feature data of the reference image and feature data of the comparison image. The extracted image obtained or the extracted data obtained may be stored in the extracted image DB 512.

The image feature extraction neural network 502 may output feature data of the reference image and feature data of the extracted image by using the reference image and the extracted image. And in some exemplary embodiments, the image feature extraction neural network 502 may output feature data of a comparison image by using the comparison image The image feature extraction neural network 502 according to the exemplary embodiment may output feature data for the comparison image using the comparison image. The output feature data may be stored in the image feature data DB 513.

The feature data preprocessor 503 may fuse the feature data of the image acquired from the image feature data DB 513. The data fusion may be performed by a fusion network, and feature data that is concatenated or summed with respect to a channel axis may be output from the neural network.

The object feature extraction neural network unit 504 may receive the feature data and output a task result map related to the feature of the object. The object feature extracting neural network unit 504 according to the exemplary embodiment may designate the feature data of the reference image and the feature data of the extracted image as weight values to be used for neural network training.

Figure 15:
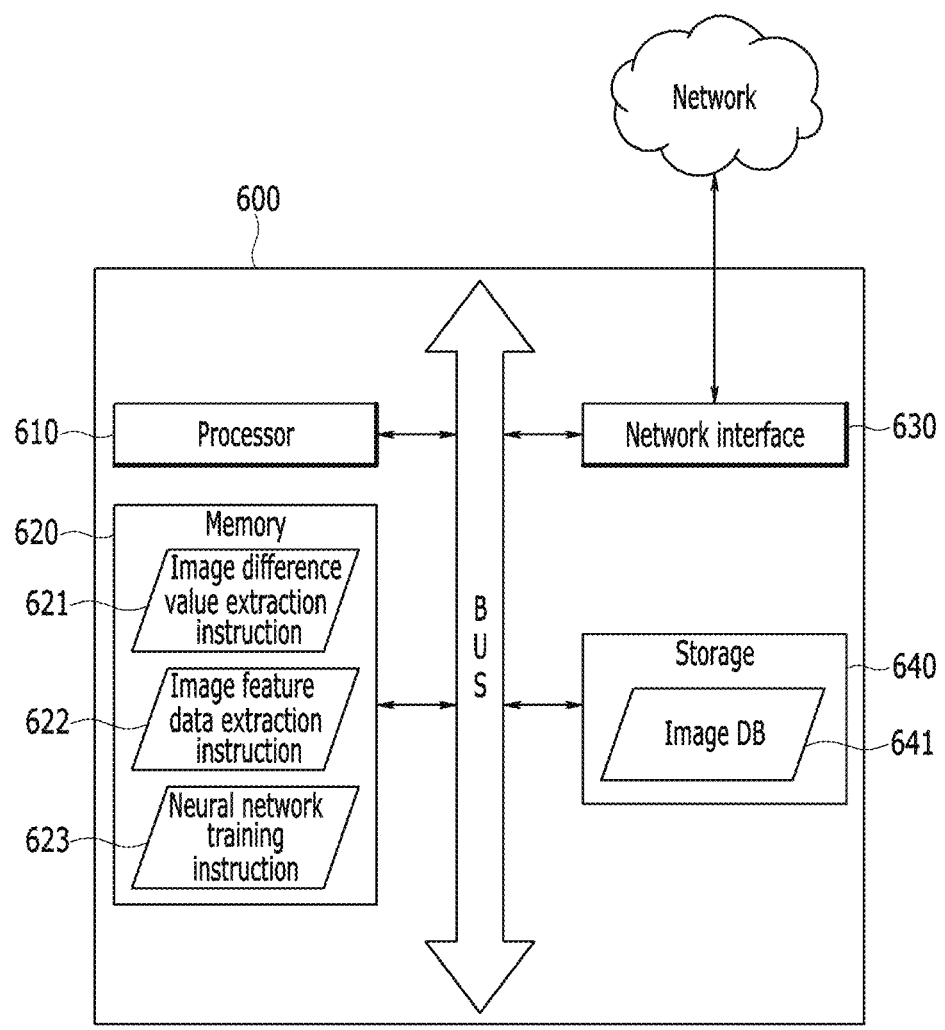
FIG. 15 is a hardware schematic diagram of a neural network training apparatus according to another exemplary embodiment of the present disclosure.

FIG. 15 is a hardware schematic diagram of a neural network training apparatus according to another exemplary embodiment of the present invention.

As shown in FIG. 15, the training apparatus 500 may be implemented in a computing device 600 having one or more processors 610, a system bus, a network interface 630, a memory 620 that loads a computer program executed by the processor 610, and a storage 640 that stores an image DB 641. FIG. 15 shows some constituent elements related to exemplary embodiments of the present disclosure. Accordingly, it will be appreciated by those skilled in the art that the present disclosure may further include other general purpose components in addition to the components illustrated in FIG. 15.

The processor 610 controls the overall operation of each component of the computing device 600. The processor 610 may be configured by including at least one of a central processing unit (CPU), a microprocessor unit (MPU), a microcontroller unit (MCU), a graphics processing unit (GPU), or any type of processor that is well-known in the art. The computing device 500 may include a plurality of processors. The processor 610 may be a processor having a structure specialized for machine learning rather than a general purpose processor.

The memory 620 stores various data, commands, and/or information. The memory 620 may load at least one or more instructions 621, 622, and 623 from the storage 640 to execute methods/operations in accordance with various exemplary embodiments of the present disclosure. The memory 620 may be implemented as a volatile memory such as RAM, but the technical range of the present disclosure is not limited.

The bus provides communication between the constituent elements of the computing device 600. The bus may be implemented as various types of buses such as an address bus, a data bus, a control bus, and the like.

The network interface 630 supports wired and wireless Internet communication of the computing device 600. In addition, the network interface 630 may support various communication methods other than Internet communication. Thus, the communication interface 630 may be configured to include a communication module that is well-known in the art of the present disclosure. In some cases, the network interface 530 may be omitted.

The storage 640 may non-temporarily store the at least one program (not shown) and the image DB 641. The storage 640 may include a non-volatile memory such as a flash memory, a hard disk, a removable disk, or any type of computer readable recording medium that is well-known in the art to which the present disclosure belongs.

The image DB 641 stores an image of an object used in neural network training of the present disclosure, an extracted image formed by data related to a difference between a plurality of images of the object, and feature data output from a neural network that extracts a feature of a plurality of images.

While being executed by an operating system, a computer program (not shown) loaded into the memory 620 performs an operation of training a CNN-based neural network using training data. As an operation result of the computer program, data defining a CNN-based neural network may be stored in the storage 640. The data defining the CNN-based neural network may be transmitted to other computing devices through the network interface 630 as a model for generating an output corresponding to the training purpose. The other computing device may use the model to perform inference. As an example of the inference, finding a location of a lesion in a medical image may be considered.

The computer program may include the instructions 621, 622, and 625 that cause the processor 610 to perform the method described with reference to FIG. 1 to FIG. 13 after being loaded into the memory 620. That is, the processor 550 may perform methods according to various exemplary embodiments related to the method described with reference to FIG. 1 to FIG. 13 by performing the instructions 621, 622, and 623. In this specification, an instruction refers to a series of computer readable instructions grouped by function and executed by a processor and constituent elements of a computer program.

Since the image difference value extraction instruction 621 according to the exemplary embodiment is executed, an extracted image formed based on a difference in pixels between the reference image and the comparison image and extracted data formed based on a difference between feature data of the reference image and feature data of the comparison image can be obtained.

Since the image feature data extraction instruction 622 according to the exemplary embodiment is performed, feature data of the reference image and feature data of the extracted image can be obtained, and feature data of the comparison image may be further obtained according to some exemplary embodiments.

Since the neural network training instruction 623 according to the exemplary embodiment is performed, a neural network extracting the features of the image and a neural network that fuses extracted feature data can be trained.

Figure 16:
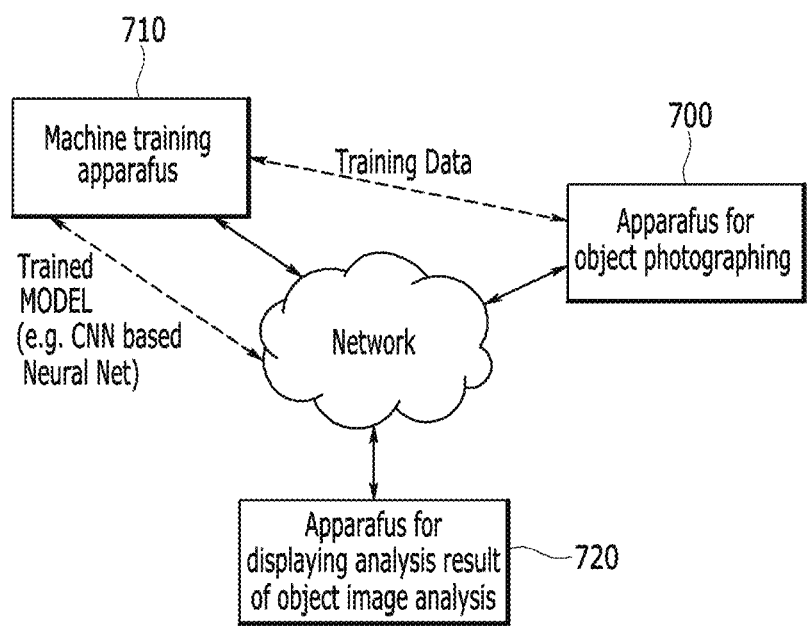
FIG. 16 is a schematic diagram of a neural network training system according to another exemplary embodiment of the present disclosure.

FIG. 16 is a schematic diagram of a neural network training system according to another exemplary embodiment of the present disclosure.

As shown in FIG. 16, a neural network training system according to the present exemplary embodiment may include an apparatus for object photographing 700 and a machine training apparatus 710. Depending on exemplary embodiments, an apparatus for displaying analysis result of object image 720 may be further included in the neural network training system according to the present exemplary embodiment. The apparatus for object photographing 700 may be referred to as a medical imaging apparatus. The machine training apparatus 710 shown in FIG. 16 may be understood as the same apparatus shown in FIG. 14 or FIG. 15. The machine training apparatus 710 may be referred to as a machine learning apparatus.

The apparatus for object photographing 700 may be a device for photographing a reference image and a comparative image according to some exemplary embodiments of the present disclosure. For example, the apparatus for object photographing may be a device for photographing a medical image of a body, and may be, for example, a device for photographing an image such as an X-ray, a CT, or an MRI. The apparatus for object photographing 700 provides the machine training apparatus 710 with image data photographed through a network. Since a medical image is sensitive personal information, the network may be a network from which external access is blocked. That is, the machine training apparatus 710 and the apparatus for object photographing 700 may be located in the same hospital.

The machine training apparatus 500 shown in FIG. 16 may be understood as the same device shown in FIG. 15. That is, it accumulates image data provided from the apparatus for object photographing 700, and when the machine training performance criterion is satisfied, the machine training apparatus 710 more highly trains a model that outputs output data suitable for the purpose of machine training by using newly accumulated image data. In such a process, the neural network training method described with reference to FIG. 1 to FIG. 13 can be carried out.

Definition data of the model training by the machine training apparatus 710 may be transmitted to the apparatus for displaying analysis result 720. Unlike the apparatus for object photographing 600 and the machine training apparatus 710, the apparatus for displaying analysis result 720 may be a computing device located outside a hospital in which the apparatus for object photographing 700 is installed. The apparatus for displaying analysis result 720 receives and stores the definition data of the model from the machine training apparatus 710, inputs an analysis object image to the model, obtains analysis result data, renders the analysis result data, and displays the result on a screen such that a reasoning result for the medical image can be displayed.

The methods according to the exemplary embodiment of the present disclosure described so far have been described as being all or constituent elements constituting the exemplary embodiments of the present disclosure that are combined or operated in conjunction with each other. The technical spirit of the disclosure is not necessarily limited to these exemplary embodiments. That is, within the scope of the present disclosure, all of the constituent elements may be selectively combined and operated.

In the drawings, although the actions are shown in a specific order, it should not be understood that the actions must be executed in a specific order or in sequential order, or that all the illustrated actions must be executed. In certain circumstances, multitasking and parallel processing may be advantageous. Moreover, the separation of the various configurations in the exemplary embodiments described above should not be understood as necessary for such separation, and it should be understood that the described program components and systems may generally be integrated together into a single software product or packaged into a plurality of software products.

Although exemplary embodiments of the present disclosure have been described with reference to the accompanying drawings, a person of ordinary skill in the art may implement the present disclosure in other specific forms without changing the technical spirit or essential features. Therefore, it should be understood that the exemplary embodiments described above are exemplary in all respects and not restrictive. The protection range of the present disclosure should be interpreted by the following claims, and all technical ideas within the equivalent range shall be interpreted as being included in the scope of the technical idea defined by the present disclosure.

What is claimed is:

1. A neural network training method performed by a computing device, comprising:
   acquiring a reference image photographed with a first setting with respect to an object and a first comparison image photographed with a second setting with respect to the object;
   acquiring feature data of the reference image from a first neural network trained by using the reference image;
   generating a first difference image formed from data related to a difference between the reference image and the first comparison image;
   acquiring feature data of the first difference image from a second neural network, wherein the second neural network is trained by using the first difference image; and
   training a third neural network by using the feature data of the reference image and the feature data of the first difference image,
   wherein the third neural network is trained to output a result reflecting the feature data of the reference image and the feature data of the first difference image.

2. The neural network training method of claim 1, wherein the second neural network is trained by further using depth information of the reference image, depth information of the first comparison image, and the first difference image.

3. The neural network training method of claim 1, further comprising:
   acquiring a second comparison image photographed with a third setting with respect to the object; and
   acquiring feature data of a second difference image from a fourth neural network, wherein the fourth neural network is trained by using the second difference image formed from data related to a difference between the reference image and the second comparison image,
   wherein training the third neural network comprises training the third neural network by using the feature data of the reference image, the feature data of the first difference image, and the feature data of the second difference image, and
   wherein the third neural network is trained to output a result reflecting the feature data of the reference image, the feature data of the first difference image and the feature data of the second difference image.

4. The neural network training method of claim 3, wherein the fourth neural network is trained by further using depth information of the reference image, depth information of the second comparison image, and the second difference image.

5. The neural network training method of claim 3, wherein the first setting, the second setting, and the third setting have different photographing directions, and
   wherein a photographing direction of the second setting and a photographing direction of the third setting are symmetrical with reference to a photographing direction of the first setting.

6. The neural network training method of claim 3, wherein training the third neural network comprises
   training the third neural network by using the feature data of the first image assigned with a first weight value, the feature data of the first difference image assigned with a second weight value, and the feature data of the second extracted image assigned with a third weigh value.

7. The neural network training method of claim 6, wherein the first weight value is greater than the second weight value and the third weight value.

8. The neural network training method of claim 6, wherein the second weight value and the third weight value are equivalent to each other.

9. The neural network training method of claim 1, wherein the third neural network comprises a layer that fuses the feature data of the reference image and the feature data of the first difference image.

10. The neural network training method of claim 1, further comprising:
acquiring a new reference image photographed with a setting that is different from the first setting with respect to the object and a new comparison image photographed with respect to the object corresponding to the new reference image;
acquiring feature data of the new reference image from the first neural network trained by using the new reference image;
acquiring feature data of a new difference image from the second neural network, wherein the second neural network is trained by using the new difference image formed from data related to a difference between the new reference image and the new comparison image; and
training the third neural network by using the feature data of the new reference image and the feature data of the new difference image.

11. A computer program stored in a non-transitory computer readable medium, executed, in combination with a computer, comprising instructions for:
acquiring a reference image photographed with reference to a first setting with respect to an object and a first comparison image photographed with respect to a second setting with respect to the object;
acquiring feature data of the reference image from a first neural network trained by using the reference image;
acquiring feature data of a first difference image from a second neural network, wherein the second neural network is trained by using the first difference image formed from data related to a difference between the reference image and the first comparison image; and
training a third neural network by using the feature data of the reference image and the feature data of the first difference image,
wherein the third neural network is trained to output a result reflecting the feature data of the reference image and the feature data of the first difference image.

12. The computer program of claim 11, wherein acquiring the feature data of the first extracted image further comprises:
acquiring a second comparison image photographed with a third setting with respect to the object;
generating a second difference image formed from data related to a difference between the reference image and the second comparison image;
acquiring feature data of the second difference image from a fourth neural network, wherein the fourth neural network is trained by using the second difference image, and
wherein training the third neural network comprises training the third neural network by using the feature data of the reference image, the feature data of the first difference image, and the feature data of the second difference image, and
wherein the third neural network is trained to output a result reflecting the feature data of the reference image, the feature data of the first difference image and the feature data of the second difference image.

13. The computer program of claim 12, wherein the fourth neural network is trained by further including depth information of the reference image, depth information of the second comparison image, and the second difference image.

14. The computer program of claim 12, wherein the first setting, the second setting, and the third setting have different photographing directions, and
wherein a photographing direction of the second setting and a photographing direction of the third setting are symmetrical with reference to a photographing direction of the first setting.

15. A machine training apparatus comprising:
a memory that stores one or more instructions; and
a processor, by executing the one or more instructions, that
acquires a reference image photographed with a first setting with respect to an object and a first comparison image photographed with a second setting with respect to the object by performing the stored one or more instructions,
acquires feature data of the reference image from a first neural network trained by using the reference image,
generating a first difference image formed from data related to a difference between the reference image and the first comparison image,
acquires feature of the first difference image from a second neural network, wherein the second neural network is trained by using the first difference image, and
trains a third neural network by using the feature data of the reference image and the feature data of the first difference image,
wherein the third neural network is trained to output a result reflecting the feature data of the reference image and the feature data of the first difference image.

16. The machine training apparatus of claim 15, wherein the processor
acquires a second comparison image photographed with a third setting with respect to the object,
acquires feature data of a second difference image from a fourth neural network, wherein the fourth neural network is trained by using the second difference image formed from data related to a difference between the reference image and the second comparison image, and
trains the third neural network by using the feature data of the reference image, the feature data of the first difference image, and the feature data of the second difference image,
wherein the third neural network is trained to output a result reflecting the feature data of the reference image, the feature data of the first difference image and the feature data of the second difference image.

17. The machine training apparatus of claim 16, wherein the processor trains the third neural network by using the feature data of the reference image assigned with a first weight value, the feature data of the first difference data assigned with a second weight value, and the feature data of the second difference image assigned with a third weight value.

18. The machine training apparatus of claim 17, wherein the second weight value and the third weight value are equivalent to each other.

* * * * *